Figure 1:
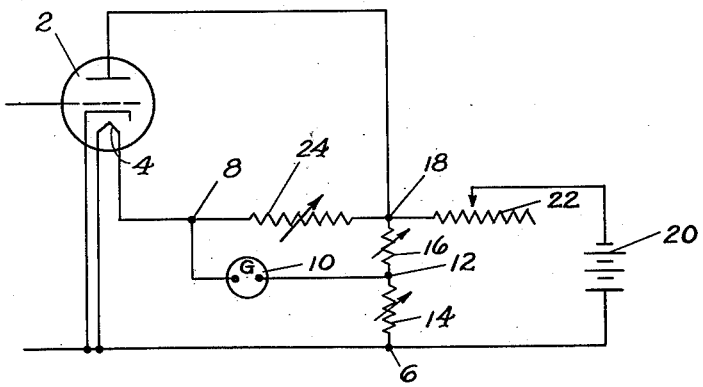

June 17, 1952  F. K. KLUTKE  2,600,778

MEASURING INSTRUMENT

Filed May 17, 1950

INVENTOR.
Fritz K Klutke
BY
Bailey, Stephens & Huettig
ATTORNEYS

Patented June 17, 1952

2,600,778

UNITED STATES PATENT OFFICE 2,600,778

MEASURING INSTRUMENT

Fritz K. Klutke, Lübeck, Germany, assignor to Otto Heinrich Dräger, Lübeck, Germany Application May 17, 1950, Serial No. 162,531
In Germany September 9, 1949

5 Claims. (Cl. 171—95)

The invention relates to vacuum tube circuits, and more especially to circuits intended for use with tubes utilized in measuring instruments.

Errors of substantial magnitude often occur in instruments using vacuum tubes, and exact measurement with such instruments cannot be depended on. One of the principal reasons for this is that the anode currents furnished by the tubes depend to a great degree upon the voltage which heats the filament. Unless this heating voltage is maintained constant within a narrow range, accurate measurement is impossible.

It has been heretofore proposed to use tubes with high cathode voltages and low heating current, and to maintain the heating voltage constant by known arrangements. However, these devices have required operation by currents of 100 volts or more, and therefore this solution is not satisfactory in connection with low voltage devices, especially portable measuring instruments.

The primary object of the present invention is to provide a circuit which will make it possible to maintain the heating voltage substantially constant even when using low cathode voltages.

Another object of the invention is to provide a circuit for this purpose which will indicate deviations of the heating voltage from its desired value.

A further object of the invention is to provide in such a circuit an arrangement by which it can be periodically calibrated.

Still another object of the invention is to provide a circuit which is simple and economical.

Still a further object of the invention is to provide a circuit in which a single source of current furnishes both the heating voltage and the anode voltage.

An additional object of the invention is to provide a circuit of this last type in which an instrument for measuring the anode voltage serves for the calibration of the instrument indicating the heating voltage.

In general, the invention contemplates a bridge circuit in which heating filament of the tube lies in one of the legs of the bridge, an instrument in the diagonal of the bridge serving to indicate undesired variations in the heating voltage.

Further objects and advantages of the invention will appear more fully from the following description, especially when taken in conjunction with the accompanying drawings which form a part thereof.

Figure 2:
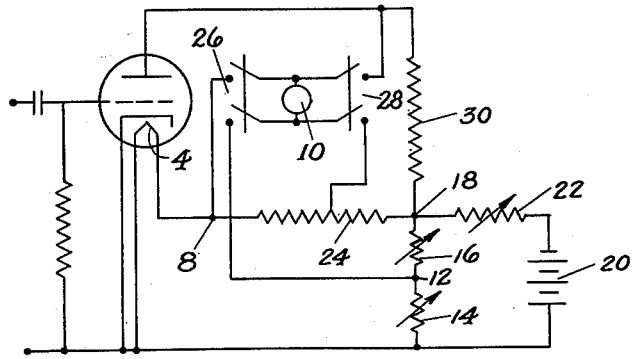
Figure 3:
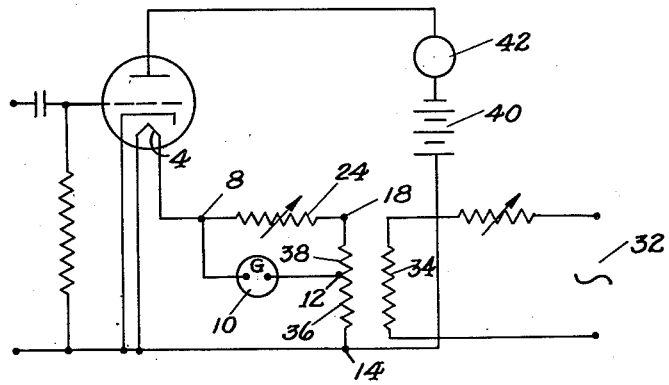

In the drawings:

Figs. 1 to 3 are diagrams of three modifications of a circuit embodying the invention.

In the modification of Fig. 1, tube 2 has a heating coil 4, connected as the first leg between current supply terminal 6 and terminal 8 of the bridge diagonal which includes a measuring instrument 10, such as a galvanometer or voltmeter. The other terminal 12 of the diagonal is connected as the second and third legs through resistances 14, 16 to current supply terminals 6 and 18, which are connected with current source 20 and variable resistance 22. A resistance 24 is connected as the fourth leg between terminals 8 and 18.

It will be noted that the anode voltage is also supplied by source 20.

It is apparent with such a circuit that, as long as the other values remain constant, any variation in the heating voltage will be reflected by variation in the indications of instrument 10. The variation can then be corrected by changing the setting of resistance 22. If desired, suitable circuits could be supplied for varying resistance 22 automatically in response to variations in the current in the diagonal of the bridge.

In the form shown in Fig. 2, which shows a circuit with compensated anode current, the bridge diagonal includes a switch arrangement 26 by which instrument 10 can be connected therein as desired. A similar switch device 28 serves for coupling this instrument in the diagonal of a second bridge circuit, whose legs are composed of resistance 30, the two parts of resistance 24 and the tube itself.

When switches 26 are closed, the device operates in the same manner as in Fig. 1. The constancy of the anode voltage can be checked, and compared with the heating voltage, when desired, by opening switches 26 and closing switches 28.

Fig. 3 shows a device intended to be fed by an alternating current source 32. This feeds the primary 34 of a transformer, the secondary of which has coil portions 36, 38 in lieu of resistances 14, 16. A direct current source 40 feeds the anode through measuring instrument 42.

While I have described herein some embodiments of my invention, I wish it to be understood that I do not intend to limit myself thereby except within the scope of the claims hereto or hereinafter appended.

I claim:

1. In a measuring instrument, a vacuum tube having a cathode and a separate heating element therefor, a bridge circuit for supplying heating current to said element, said element being directly connected in one of the legs of said circuit, means to supply to said bridge circuit sufficient direct electric current to cause said heating element to heat said cathode to emitting temperature, and a device responsive to current variations connected in one of the other parts of the bridge circuit.

2. In a measuring instrument, a vacuum tube having a cathode and a separate heating element therefor, a bridge circuit for supplying heating current to said element, said element being directly connected in one of the legs of said circuit, means to supply to said bridge circuit sufficient direct electric current to cause said heating element to heat said cathode to emitting temperature, and a device responsive to current variations connected in the diagonal of the bridge circuit.

3. In a measuring instrument, a vacuum tube having a cathode and a separate heating element therefor, a bridge circuit for supplying heating current to said element, said element being directly connected in one of the legs of said circuit, means to supply to said bridge circuit sufficient direct electric current to cause said heating element to heat said cathode to emitting temperature, and a measuring instrument connected in the diagonal of the bridge circuit.

4. In a measuring instrument, a source of current, a vacuum tube having an anode and a heating element therein, a bridge circuit connecting said heating element to said source, said element being connected in one of the legs of said circuit, a measuring instrument connected in the diagonal of the circuit, and connections between said current source and said anode.

5. In a measuring instrument, a source of current, a vacuum tube having an anode and a heating element therein, a bridge circuit connecting said heating element to said source, said element being connected in one of the legs of said circuit, a measuring instrument, a second bridge circuit connecting said anode to said source, and means for selectively connecting said instrument in the diagonals of said bridge circuits.

FRITZ K. KLUTKE.

REFERENCES CITED

The following references are of record in the file of this patent:

UNITED STATES PATENTS

| Number | Name | Date |
|---|---|---|
| 1,555,757 | Respondek | Sept. 29, 1925 |
| 2,315,593 | Cassen | Apr. 6, 1943 |